United States Patent [19]

Guillevic

[11] 4,360,567
[45] Nov. 23, 1982

[54] EASY-TO-CLEAN GLASS OR GLASS-CERAMIC COOKWARE IN THE ALKALINE EARTH METAL OXIDE-Al₂O₃-SiO FIELD

[75] Inventor: Gildas J. M. Guillevic, Avon, France

[73] Assignee: Corning Glass Works, Corning, N.Y.

[21] Appl. No.: 237,850

[22] Filed: Feb. 25, 1981

[30] Foreign Application Priority Data

Mar. 7, 1980 [FR] France .................. 80 05188
Jan. 30, 1981 [FR] France .................. 81 01801

[51] Int. Cl.³ .................. B32B 9/00; B32B 17/06; C03C 3/10; C03C 3/22
[52] U.S. Cl. .................. 428/410; 501/8; 501/9; 501/32
[58] Field of Search .................. 428/410, 428; 501/8, 501/9, 32

[56] References Cited

U.S. PATENT DOCUMENTS

| | | | |
|---|---|---|---|
| 3,022,179 | 2/1962 | Morrissey | 501/2 |
| 3,022,180 | 2/1962 | Morrissey et al. | 501/5 |
| 3,201,266 | 8/1965 | MacDowell | 501/6 |
| 3,272,610 | 9/1966 | Eppler et al. | 501/8 |
| 3,275,493 | 9/1966 | MacDowell | 501/9 |
| 3,531,303 | 9/1970 | Bahat | 501/8 |
| 3,772,041 | 11/1973 | Tochon | 501/8 |
| 3,837,978 | 9/1974 | Basdiecker | 501/8 |
| 3,998,617 | 12/1976 | Gliemeroth | 501/7 |
| 4,015,048 | 3/1977 | Martin | 501/9 |

*Primary Examiner*—Mark Bell
*Attorney, Agent, or Firm*—Clinton S. Janes

[57] ABSTRACT

The present invention is directed to the production of glass and glass-ceramic compositions which have particular utility as culinary utensils inasmuch as they are exceptionally easy to clean after food has been burned thereon. The products have at least an integral surface layer which contains MgO-based and/or CaO-based and/or SrO-based and/or BaO-based crystals as the predominant crystal phase. Operable compositions consist essentially, expressed in weight percent on the oxide basis, of 14.8–19.6% MgO, 16.2–20.0% Al₂O₃, and 58.7–66.5% SiO₂, when said surface layer contains MgO-based crystals as the predominant crystal phase, 22.2–31.6% CaO, 42.8–53.9% Al₂O₃, and 23.8–33.6% SiO₂, when said surface layer contains CaO-based crystals as the predominant crystal phase, 31–48% SrO, 24–35.7% Al₂O₃, and 28–35% SiO₂, when said surface layer contains SrO-based crystals as the predominant crystal phase, and 42.4–45% BaO, 10–15.9% Al₂O₃, and 41.7–45% SiO₂, when said surface layer contains BaO-based crystals as the predominant crystal phase.

2 Claims, No Drawings

EASY-TO-CLEAN GLASS OR GLASS-CERAMIC COOKWARE IN THE ALKALINE EARTH METAL OXIDE-Al₂O₃-SiO FIELD

BACKGROUND OF THE INVENTION

The present invention relates to the production of sophisticated culinary utensils, such utensils having surfaces that are particularly easy to clean.

In all instances, the cleaning of metal, glass, glass-ceramic, or ceramic kitchen articles, following the cooking of food therein such that it has become "baked-on", i.e., following incomplete pyrolysis of organic substances on the surfaces of the articles, has proven to be very difficult.

Three test methods have been devised to evaluate the cleanability of those materials after food has been burned thereon, the first for use with samples of small size and the other two with full size cooking utensils.

In the first method, which has been termed the "thin burned layer test", a thin layer of a mixture consisting of an oil, albumin, sugar, and water is spread onto a sample having an approximate surface area of 16 cm² and the sample then inserted into an oven operating at 250° C. for 15 minutes. A thin layer of burned material results which is composed of partially carbonized organic substances. Typically, this layer cannot be removed from the surface of the sample by washing or even by non-abrasive mechanical action. It is necessary to immerse the sample into boiling water for several minutes in order to achieve good cleaning. This test procedure simulates the spattering of greasy substances on the sides of a cooking utensil used for baking, especially those used for roasts.

The second test method, which has been designated the "pork roast test", involves placing a pork roast into a cooking utensil and baking it in an oven. After the roast has been cooked, examination of the cooking utensil indicates that the surfaces thereof are coated with the burned-on spatterings of greasy substances which are commonly impossible to remove with a non-abrasive sponge. The utensil is placed into a home dishwasher and subjected to the normal washing cycle thereof. If the utensil is not clean, it is finished with a non-abrasive sponge.

The third test method, which has been specified as the "pork ribs baking test", contemplates placing pork ribs into a pan and baking the ribs over a flame or an electric heating element. Again, after baking, the surfaces of the pan are coated with burned-on grease spatterings which cannot be removed with a non-abrasive sponge. The same cleaning procedure as described above for the "pork roast test" is utilized.

Those three testing procedures have been complemented by a "detergent aging test" which is designed to evaluate the effect, if any, of detergent attack upon the surfaces of the material upon the cleanability of the materials. Thus, the small samples or cooking utensils are immersed for two hours at 100° C. into an aqueous solution of a dishwasher detergent (MACH 1) having a concentration of one gram/liter and then washed in tap water. The materials are visually inspected to note any alterations in appearance. Thereafter, the materials are subjected to the above-described test methods to determine any change in cleanability. This aging test in detergent is repeated to the extent of six hours' immersion, which has been deemed equivalent to several years of home use in a dishwasher.

Evaluations of current, commercially-available culinary utensils prepared from glasses, glass-ceramics, ceramics, and metals utilizing the three above test methods have yielded results indicating the difficulty of cleaning those materials. For example, the required cleaning time in the "thin burned layer test" for a PYREX ® brand glass article is 50 minutes, for a glass-ceramic article is 40 minutes, and for aluminum and ceramic articles is over 25 minutes. In the "pork roast test", those articles do not come fully clean after a cleaning cycle in the dishwasher followed by a finishing with a non-abrasive sponge.

To facilitate cleaning, certain metal culinary utensils have been coated with organic polymers such as polytetrafluoroethylene (PTFE) and the polysiloxanes (silicones). Evaluations of such coatings in the "thin burned layer test" demonstrated them to be anti-adherent. Contrariwise, however, when such coated utensils were subjected to the "pork roast test", it was observed that the partially pyrolyzed grease spatterings adhered rather strongly to the surfaces of the utensils. Accordingly, to secure complete cleaning, it was necessary to not only place them into the dishwasher for a normal washing cycle, but also to finish the cleaning with a non-abrasive sponge.

Although these polymer coatings are relatively easy to clean, where compared with articles of glass, glass-ceramic, ceramic, or metal, they nevertheless do present a number of disadvantages. For example, in like manner to all organic substances, they are quite easy to scratch and cannot stand high temperature heat treatments. Furthermore, in certain cases (PTFE) they yield noxious products of decomposition. Moreover, because of their porosity, certain PTFE coatings are stained by cooked foods.

French Pat. No. 2,319,594 discloses the deposition of metallic oxide deposits, such as $TiO_2$, $ZrO_2$, and $Al_2O_3$, onto the surfaces of glass, glass-ceramic, and ceramic cooking vessels to improve their cleanability. Truly, those oxides can produce deposits having mechanical, chemical, and thermal resistances which are superior to those of PTFE and silicones. However, the cleaning of samples coated with those oxides according to the "thin burned layer test" requires five minutes under the best conditions. Furthermore, articles coated with those oxides which were subjected to the "pork roast test" are much more difficult to clean than articles coated with PTFE or silicones, the finishing off with a nonabrasive sponge requiring more effort.

U.S. Pat. No. 4,155,788 describes the firing of finely-divided particles of a particular shale onto the surfaces of ceramic cooking utensils. This fired-on coating is stated to render the articles readily cleanable. Because of the coating, however, the utensils cannot be transparent.

OBJECTIVE OF THE INVENTION

The primary objective of the present invention is to provide products that can be transparent, that can be heated on a direct flame, that have mechanical, chemical and thermal resistances similar to those coatings of metallic oxides described in French Pat. No. 2,319,594, supra, and which have surfaces that can be cleaned as easily as those coated with silicones.

SUMMARY OF THE INVENTION

The inventive products consist of glasses or glass-ceramics which have magnesium and/or calcium and/or strontium and/or barium-containing crystals as the predominant crystal phase in and/or on their surfaces, those crystals rendering the surfaces of the products easy to clean. Thus, as determined via the "thin burned layer test", the cleaning time required for the inventive products will generally be less than five minutes and, customarily, about 1.5 minutes. Moreover, the cleaning time is relatively unaffected by exposure to detergent. With certain of the inventive products, the time required for cleaning is only about 45 seconds.

Before describing specific examples of products satisfying the objective of the present invention, an overview of the operable methods will be provided, each method involving a choice of chemical components and a choice of heat treatments.

Laboratory experimentation has demonstrated that certain glasses having compositions within the MgO and/or CaO and/or SrO and/or BaO-$Al_2O_3$-$SiO_2$ system become quite easy to clean after being heat treated in such a manner as to cause the development of crystallization therein at least on the surfaces thereof. It is the formation of those crystals at the surfaces of those materials which gives rise to that property. Examples of such crystallization have been identified as enstatite ($MgO·SiO_2$), $CaO·Al_2O_3·2SiO_2$, $SrO·Al_2O_3·2SiO_2$, and hexacelsian ($BaO·Al_2O_3·2SiO_2$), a barium aluminosilicate with a hexagonal structure.

Very seldom, however, will a single crystal phase be found alone on the surface of the above materials; rather, there will customarily be a mixture of crystal phases. For example, X-ray diffraction analyses have identified the following phases, depending upon the base composition of the starting materials: forsterite ($2MgO·SiO_2$), magnesium petalite, cordierite ($2MgO·2Al_2O_3·5SiO_2$), $\beta$-quartz solid solution, beta-spodumene solid solution, osumilite-type phases, magnetite ($Fe_3O_4$), $CaO·Al_2O_3·2SiO_2$, $SrO·Al_2O_3·2SiO_2$, tin oxide ($SiO_2$), zirconium oxide ($ZrO_2$), enstatite ($MgO·SiO_2$), and hexacelsian ($BaO·Al_2O_3·2SiO_2$).

Although a completely satisfying explanation has not been determined therefor, it has been found that, where surfaces contain only crystals of $\beta$-quartz solid solution or $\beta$-spodumene solid solution, those surfaces are quite difficult to clean. Contrariwise, if, in addition, crystals having a magnesium, calcium, strontium, and/or barium base are present, the surfaces become relatively easy to clean.

To obtain easy-to-clean surfaces from glasses having compositions within the MgO-$Al_2O_3$-$SiO_2$ system and where the surface layer contains MgO-based crystals as the predominant crystal phase, the three major constituents will be present (as expressed in weight percent) in the following proportions: 14.8–19.6% MgO, 16.2–20% $Al_2O_3$, and 58.7–66.5% $SiO_2$. Where the $SiO_2$ content is excessive, the glass becomes too difficult to melt with standard glass melting procedures. If the $Al_2O_3$ content falls below the minimum, the glass has a tendency to devitrify readily. Where the MgO content is too low, the glass will not develop a crystallized surface that qualifies as easy-to-clean.

Easy-to-clean surfaces can be obtained in glasses having compositions within the CaO-$Al_2O_3$-$SiO_2$ field, wherein the surface layer contains CaO-based crystals as the predominant crystal phase, the three principal constituents being present, as expressed in weight percent, in about 22.2–31.6% CaO, 42.8–53.9% $Al_2O_3$, and 23.8–33.6% $SiO_2$. In the SrO-$Al_2O_3$-$SiO_2$ system, wherein the surface layer contains SrO-based crystals as the predominant crystal phase, the three primary components are present, as expressed in weight percent, in about 31–48% SrO, 24–35.7% $Al_2O_3$, and 28–35% $SiO_2$. In the BaO-$Al_2O_3$-$SiO_2$ ternary, wherein the surface layer contains BaO-based crystals as the predominant crystal phase, the three major ingredients are present, as expressed in weight percent, in about 42.4–45% BaO, 10–15.9% $Al_2O_3$, and 41.7–45% $SiO_2$.

The levels of the three principal components in each of those ternary systems are under similar constraints to those recited above with respect to glasses within the MgO-$Al_2O_3$-$SiO_2$ composition field. Samples of those materials can normally be cleaned in about 1.5 minutes in the "thin burned layer test".

To confer certain desirable properties upon the inventive glasses, other than the ready cleanability of burned foodstuffs, it is possible to add small quantities (up to 10% total) of such oxides as $Li_2O$, $Na_2O$, $K_2O$, CaO, BaO, $TiO_2$, $ZrO_2$, $Cr_2O_3$, FeO, $Fe_2O_3$, NiO, ZnO, $B_2O_3$, $GeO_2$, $SnO_2$, PbO, $P_2O_5$, and $As_2O_3$, or other constituents such as $MgF_2$, $CaF_2$, FeS, ZnS, chlorides, and nitrates, either alone or in mixtures. As illustrative of such properties, it may be noted that $ZrO_2$ improves the chemical durability of the glasses, the alkali metal oxides improve the resistance to devitrification of the glasses, the iron sulfides or salts permit tinting of the glasses, and arsenic oxide, chlorides, and nitrates can be useful as fining agents.

CaO, BaO, $B_2O_3$, $GeO_2$, PbO, and $P_2O_5$ are some of the oxides which, in certain proportions, delay the development of surface crystallization.

Surface crystallization can be obtained on the inventive materials via simple heat treatments. Although crystals begin forming at a temperature of about 840° C., the extent of such crystallization is not sufficient to make the surfaces easy to clean. Therefore, it is necessary to work at temperatures above about 850° C. and as high as about 1100° C. The duration of the heat treatment will commonly be at least one hour in order to insure satisfactory levels of crystallization. Much longer periods can be utilized with no deleterious effect, but such can become economically unattractive. A treating time of about 17 hours has been deemed to constitute a practical maximum. It is to be noted that, the higher the temperature of treatment or the longer the duration of treatment, the greater will be the extent of crystallization. To insure better uniformity and homogeneity of the crystallization developed, it is preferable to utilize a two-step thermal treatment, viz., an initial exposure of a glass to induce nucleation followed by a treatment to cause growth of crystals on the nuclei. In general, the nucleation step will be conducted at a lower temperature than the crystallization growth, e.g., a one-hour period of constant temperature at 850° C. followed by a one-hour dwell period at 950° C., but that practice is not required.

The use of heat treatments alone to develop surface crystallization can have certain disadvantages such as thermal distortion of the body, the glass deforms at about 900° C., and heterogeneous crystallization. These defects can be prevented by depositing upon the surface of the glass body, before heat treatment, such materials as NaCl, $MgCl_2$, $MgCO_3$, MgO, saturated and unsaturated, substituted or unsubstituted hydrocarbons, such as paraffins, animal, vegetable, or mineral oils or greases, waxes, or by any mixture of the above compounds. That practice enables crystals to be obtained which are of smaller size and which are more uniformly distributed over the surface of the body and, secondly, that practice enables the development of crystals to be undertaken at temperatures below the distortion point of the glass. For example, an easy-to-clean surface can be obtained after a heat treatment of 1.5 hours at 880° C. However, not all coatings act to favor the growth of surface crystallization. Talc and kaolin appear to inhibit surface crystallization.

All of the compositional and process parameters discussed above were related to glasses in which the composition of the precursor glass made it possible to secure magnesium and/or calcium and/or strontium and/or barium-based crystals in the surface thereof. Nevertheless, it is possible to obtain surface crystals rendering the products easy to clean on the surfaces of glass-ceramics which contain little or no MgO and/or CaO and/or SrO and/or BaO in their compositions such that no significant amount, if any, of a MgO-based, CaO-based, SrO-based, or BaO-based crystal phase is formed. That feature can be accomplished by coating the surface of the precursor glass-ceramic with a magnesium, calcium, strontium, or barium derivative and then firing the coating to set the magnesium, calcium, strontium, or barium, i.e., by forcing it into the crystal structure. It is preferred to utilize an alkali metal salt, e.g., a sodium salt, which facilitates the reaction between the magnesium, calcium, strontium, or barium derivative or a product of decomposition thereof and the surface of the glass-ceramic. Those coatings can be applied via different techniques, for example, dipping, serigraphy, and spraying. The reaction temperature employed depends essentially upon the nature of the alkali metal salt utilized and on its concentration in the treatment mixture. As an illustration of that practice, a 10% by weight concentration of a sodium salt will be operable at treatment temperatures as low as 700° C. The practice has enabled the production of such surface crystals as $\beta$-quartz solid solution, magnesium $\beta$-quartz solid solution, $\beta$-spodumene solid solution, $ZrO_2$, mica, hexacelsian, and cordierite. This practice, involving an ion exchange reaction, frequently leads to a product having substantially improved mechanical strength when compared with the precursor, uncoated glass-ceramic article.

The products obtained through the above-described process have easy-to-clean surfaces and have good mechanical strength, chemical durability, and thermal shock resistance, which features are important, especially in the field of cooking utensils. The inventive products can also have utility in other fields such as oven doors, oven sides, heating elements, and in the chemical or parachemical industry.

PRIOR ART

U.S. Pat. No. 3,022,179 discloses the preparation of glass-ceramic articles consisting essentially, by weight, of 3-35% MgO, 3-35% BaO, 25-50% $SiO_2$, and 10-35% fluxing agents selected from the group of $MgF_2$, $B_2O_3$, $Al_2O_3$, $Li_2O$, $K_2O$, $K_2SiF_6$, and $Al_2(SiF_6)_3$. Such compositions are outside the ranges operable in the present invention.

U.S. Pat. No. 3,022,180 describes the manufacture of glass-ceramic articles consisting essentially, by weight, of 20-50% MgO, 5-20% $Al_2O_3$, 20-55% $SiO_2$, and 5-15% fluxing agents selected from the group of $Na_2O$, $B_2O_3$, $K_2SiF_6$, and $K_2O$. Such compositions are outside the ranges operable in the present invention.

U.S. Pat. No. 3,201,266 is concerned with the production of glass-ceramic articles containing nepheline and celsian and/or hexacelsian as the predominant crystal phases from compositions consisting essentially, by weight, of 10-20% $Na_2O$, 1-20% BaO, 28-38% $Al_2O_3$, 30-55% $SiO_2$, and 5-12% $TiO_2$. Such compositions are outside the ranges operable in the present invention.

U.S. Pat. No. 3,272,610 relates to the fabrication of glass-ceramic articles containing hexacelsian and magnesium dititanate as the predominant crystal phases from compositions consisting essentially, by weight, of 7-10% MgO, 16-19.5% BaO, 16.5-19% $Al_2O_3$, 46-49% $SiO_2$, and 6-12% $TiO_2$. Such compositions are outside the ranges operable in the present invention.

U.S. Pat. No. 3,275,493 is directed to the formation of glass articles consisting essentially, by weight, of 10-22% MgO, 30-40% $Al_2O_3$, 40-57% $SiO_2$, and 0.5-6% $As_2O_3$ and/or $Sb_2O_3$. The glass articles can be heat treated at 860°-950° C. to cause the in situ development of an integral surface layer thereon containing cordierite as the predominant crystal phase. Such compositions are outside the ranges operable in the present invention.

U.S. Pat. No. 3,998,617 is concerned with the formation of a lithium aluminosilicate glass or glass-ceramic article having an integral surface layer containing lithium aluminosilicate crystals having a lower coefficient of thermal expansion than the base article. This composite article is produced by applying to the starting uncrystallized glass body a coating composition which can be converted through heat treatment to the desired lithium aluminosilicate crystals. The heat treatment is continued at sufficiently high temperatures for a sufficiently long period of time to cause, through epitaxy, the formation upon the original body of lithium aluminosilicate crystals having a lower coefficient of thermal expansion than the body. The cited compositions are outside the ranges operable in the present invention.

DESCRIPTION OF THE PREFERRED EMBODIMENTS

The following examples, describing certain articles produced in conformity with the invention, must be deemed to be only illustrative of the invention and not restrictive.

EXAMPLE 1

The glasses set forth in the following table in terms of parts by weight were formed in the shape of poured or rolled plates which were transferred to an annealer operating at 830°-850° C. Because the sum of the components totals or approximately totals 100, for all practical purposes the reported values can be deemed to represent weight percent.

| Glass No. | 1 | 2 | 3 | 4 | 5 | 6 | 7 | 8 | 9 | 10 | 11 | 12 | 13 | 14 |
|---|---|---|---|---|---|---|---|---|---|---|---|---|---|---|
| $SiO_2$ | 63.1 | 62.5 | 61.9 | 61.5 | 61.2 | 62.5 | 41.7 | 45 | 35 | 28 | 28 | 33.6 | 25.4 | 23.8 |
| $Al_2O_3$ | 18.2 | 16.3 | 16.8 | 16.8 | 16.7 | 17.0 | 15.9 | 10 | 32 | 24 | 35.7 | 42.8 | 43 | 53.9 |
| MgO | 18.6 | 18.8 | 18.8 | 18.7 | 18.6 | 19.0 | — | — | — | — | — | — | — | — |

-continued

| Glass No. | 1 | 2 | 3 | 4 | 5 | 6 | 7 | 8 | 9 | 10 | 11 | 12 | 13 | 14 |
|---|---|---|---|---|---|---|---|---|---|---|---|---|---|---|
| SrO | — | — | — | — | — | — | — | — | 31 | 48 | 36.3 | — | — | — |
| BaO | — | — | — | — | — | — | 42.4 | 45 | — | — | — | — | — | — |
| CaO | — | — | — | — | — | — | — | — | — | — | — | 23.6 | 31.6 | 22.2 |
| $ZrO_2$ | — | 2.0 | 2.0 | 2.0 | 1.9 | — | — | — | — | — | — | — | — | — |
| $Li_2O$ | — | — | 0.5 | — | — | — | — | — | — | — | — | — | — | — |
| $Na_2O$ | — | — | — | 1.0 | — | — | — | — | — | — | — | — | — | — |
| $K_2O$ | — | — | — | — | 1.6 | — | — | — | — | — | — | — | — | — |
| FeS | — | — | — | — | — | 1.5 | — | — | — | — | — | — | — | — |
| $Cr_2O_3$ | — | — | — | — | — | — | — | — | 9 | — | — | — | — | — |

Squares about 4×4 cm were cut from the plates and introduced into an electrically-heated oven operating at 850° C. After a dwell period of one hour, the temperature of the oven was increased to 950° C. over a period of approximately seven minutes. Following a holding period of one hour, the current to the oven was cut off and the samples immediately removed therefrom.

X-ray diffraction analyses of the surfaces of several of the samples revealed the presence of the following crystal phases.

| | Glass No. | | | |
|---|---|---|---|---|
| | 1 | 2 | 6 | 7 |
| Crystal Phases | β-quartz solid solution, Enstatite, Magnesium petalite | β-quartz solid solution, Enstatite, Magnesium petalite | β-quartz solid solution, Enstatite, Magnesium petalite | Hexacelsian |

| | 10 | 11 | 12 | 13 |
|---|---|---|---|---|
| Crystal Phases | $SrO \cdot Al_2O_3 \cdot 2SiO_2$ | $\beta\text{-}4SrO \cdot Al_2O_3$ | $CaO \cdot Al_2O_3 \cdot 2SiO_2$ | $Ca_{1.8}Al_2O_{4.8}$ |

The squares were then submitted to the "thin burned layer test". The cleaning time was about 1.5 minutes which was unchanged even after three successive two-hour treatments with the detergent, except for Glasses Nos. 7 and 12–14, the cleaning time for which became 10 minutes for Glass No. 7 and even longer for Glasses Nos. 12–14 after the third immersion in the detergent.

EXAMPLE 2

The following glasses recorded below in terms of parts by weight were prepared in like manner to the glasses discussed above in Example 1. (Again, for all practical purposes the individual ingredients can be considered to be present in weight percent.) Squares 4×4 cm were cut from the plates, placed in an electrically-heated oven operating at 900° C., held at that temperature for one hour, the temperature in the oven raised to 1000° C., maintained at that temperature for one hour, and the squares then removed from the oven and cooled in the ambient air. MgO-containing crystals constituted the predominant crystal phase present in the surface of each sample.

The squares were thereafter subjected to the "thin burned layer test" and the time required (expressed in minutes) for cleaning reported below. The very brief time required for cleaning again illustrates the effectiveness of the presence of MgO-containing crystals in rendering the products easy to clean.

| Glass No. | 9 | 10 | 11 | 12 |
|---|---|---|---|---|
| $SiO_2$ | 59.4 | 61.2 | 60.2 | 60.2 |

-continued

| Glass No. | 9 | 10 | 11 | 12 |
|---|---|---|---|---|
| $Al_2O_3$ | 16.2 | 16.7 | 16.6 | 16.6 |
| MgO | 18.1 | 18.6 | 18.6 | 15.6 |
| $ZrO_2$ | 1.8 | 1.9 | 1.9 | 1.9 |
| $K_2O$ | 1.6 | — | 1.6 | 1.6 |
| BaO | 2.9 | 1.6 | — | — |
| $B_2O_3$ | — | — | 1.0 | 1.0 |
| PbO | — | — | — | 3.0 |
| Cleaning Time When New | 3 | 10 | 1.5 | 1.5 |
| Cleaning Time After 2 Hours Detergent | 1.5 | 1.5 | 1.5 | 1.5 |
| Cleaning Time after 4 Hours Detergent | 1.5 | 1.5 | 1.5 | 1.5 |
| Cleaning Time After 6 Hours Detergent | 1.5 | 1.5 | 1.5 | 1.5 |

EXAMPLE 3

Squares of glasses having the following compositions, expressed in parts by weight, although for all practical purposes the recorded levels can be deemed to reflect weight percent, were formed in accordance with the procedure described above with respect to Example 1. The squares were heated to 200° C. and a mixture prepared by blending approximately five grams of NaCl into 100 cm³ of peanut oil then applied via a brush to the surfaces of the squares. The articles were then introduced into an electrically-heated oven operating at 880° C., maintained at that temperature for 1.5 hours, and thereafter withdrawn from the oven. Each sample could be cleaned in about 1.5 minutes after exposure to the "thin burned layer test" and that time was not significantly affected by prior exposure to detergent. MgO-containing crystals constituted the principal crystal phase in the surfaces of each square.

| Glass No. | 13 | 14 | 15 | 16 | 17 |
|---|---|---|---|---|---|
| $SiO_2$ | 66.5 | 61.8 | 58.7 | 59.8 | 65.5 |
| $Al_2O_3$ | 17.2 | 16.7 | 20.0 | 17.0 | 16.9 |
| MgO | 14.8 | 19.3 | 17.5 | 19.6 | 14.6 |
| $ZrO_2$ | 1.4 | 2.1 | 2.9 | 2.1 | 1.4 |
| $Na_2O$ | — | — | — | — | 0.8 |
| $K_2O$ | — | — | 2.9 | 1.4 | 0.8 |

EXAMPLE 4

Cooking utensils were formed from glass No. 17, described above in Example 3. A mixture prepared by blending together two parts by weight of NaCl, 28 parts by weight of graphite powder, 50 parts by weight of distilled water, and 20 parts by weight of Carbowax (a water-soluble, waxy solid polyethylene glycol) was brushed onto the ware and allowed to dry in the ambient air. The coated articles were introduced into an electrically-heated oven operating at 880° C., maintained therein for 1.75 hours, and the current to the oven then cut off with the utensils retained within the oven. The ware cooled to about 200° C. at an average rate of about 40° C./hour at which temperature the articles were removed from the oven.

After cooling and cleaning in water, the utensils were subjected to the "pork roast test". Following a normal cycle in a home dishwasher, the inside surfaces of the articles were clean and the outside surfaces were rendered completely clean with a brief finishing with a non-abrasive sponge.

Because of their very ready cleanability, the exemplary compositions recited and discussed in Examples 1, 2 and 3 represent the most preferred embodiments of the invention where the body of the final product contains substantial amounts of MgO and/or BaO.

EXAMPLE 5

A 4×4 cm square sample of a transparent glass-ceramic wherein β-quartz solid solution crystals constituted the predominant phase, and a 4×4 cm square sample of an opaque glass-ceramic wherein beta-spodumene solid solution crystals constituted the predominant phase were coated with an aqueous mixture consisting essentially, in weight percent, of 45% basic magnesium carbonate, 45% powdered refractory material consisting primarily of cordierite crystals with beta-quartz solid solution as a secondary phase, and 10% sodium carbonate. The squares were placed into an oven, heated from about 25° C. to 830° C. in 2.5 hours, held at that temperature for 0.25 hour, and then cooled rapidly to room temperature.

The squares were washed in water and thereafter subjected to the "thin burned layer test". Each square could be cleaned in about 0.75 minute and that time was not appreciably altered even after three two-hour exposures to the detergent.

The coated products demonstrated substantially greater mechanical strengths than the parent glass-ceramic.

Coated products manifesting equally excellent cleanability and mechanical strength can be prepared by applying the coating mixture to a glass body of the proper composition and then heat treating said glass body to simultaneously crystallize the glass to a glass-ceramic and react the coating with the crystals of the glass-ceramic.

I believe that one factor influencing the cleanability of the inventive materials is the strength of the chemical bonds between the surfaces of the articles and the adsorbed molecules. In order to better understand that phenomenon, surfaces of transparent glass-ceramics, wherein β-quartz solid solution crystals constituted the predominant crystal phase and surfaces of identical glass-ceramics which had been treated in accordance with Example 5 above, were examined utilizing infrared attenuated total reflectance. I considered only the area of OH groups between 4000 and 3000 cm$^{-1}$.

Examination of the untreated glass-ceramic having a surface which is difficult to clean showed a peak at 3550 cm$^{-1}$ due to OH groups bonded to the cations of the glass-ceramic with a σ-bond. This peak is characteristic of strongly adsorbed water and is higher than the one at 3300 cm$^{-1}$ due to OH groups of weakly adsorbed water through intermolecular hydrogen bonds.

Examination of the surface treated glass-ceramic which is easy to clean evidenced a contrasting situation; viz., a peak at 3540 cm$^{-1}$ due to strongly adsorbed OH groups which is less intense than a peak at 3250 cm$^{-1}$ due to weakly adsorbed OH groups.

Those observations can be explained on the following basis. Inspection by means of an X-ray diffraction reflectometer of the surfaces which are easy to clean has indicated the crystals to be highly oriented parallel to the surface of the article. It is known that the bond strengths between cleavage planes are weaker than the bond strengths present in a material having a random structure. Consequently, by analogy, the bond strengths between a cleavage plane and OH groups are weaker also.

Therefore, if water molecules (OH groups) can be weakly fixed onto surfaces, it follows that organic molecules (and burnt food) can be weakly fixed also. Such weak bonds are easily hydrolyzed, i.e., the organic molecules are readily removed in water.

I claim:

1. A glass or glass-ceramic article having at least an integral surface layer containing MgO-based and/or CaO-based and/or SrO-based and/or BaO-based crystals which is easy to clean after partial pyrolysis of organic materials on its surface which consists essentially, expressed in weight percent on the oxide basis, of:
   (a) 14.8–19.6% MgO, 16.2–20.0% $Al_2O_3$, and 58.7–66.5% $SiO_2$, when said surface layer contains MgO-based crystals as the predominant crystal phase; or
   (b) 22.2–31.6% CaO, 42.8–53.9% $Al_2O_3$, and 23.8–33.6% $SiO_2$, when said surface layer contains CaO-based crystals as the predominant crystal phase; or
   (c) 31–48% SrO, 24–35.7% $Al_2O_3$, and 28–35% $SiO_2$, when said surface layer contains SrO-based crystals as the predominant crystal phase; or
   (d) 42.4–45% BaO, 10–15.9% $Al_2O_3$, and 41.7–45% $SiO_2$, when said surface layer contains BaO-based crystals as the predominant crystal phase.

2. A glass-ceramic article having an interior portion containing β-quartz solid solution and/or β-spodumene solid solution as the predominant crystal phase, said interior portion being essentially free from MgO and/or CaO and/or SrO and/or BaO, and an integral surface layer containing MgO-based and/or CaO-based and/or SrO-based and/or BaO-based crystals as the predominant crystal phase which is easy to clean after partial pyrolysis of organic materials on its surface, said surface layer consisting essentially, expressed in weight percent on the oxide basis, of:
   (a) 14.8–19.6% MgO, 16.2–20-0% $Al_2O_3$, and 58.7–66.5% $SiO_2$, when said surface layer contains MgO-based crystals as the predominant crystal phase; or
   (b) 22.2–31.6% CaO, 42.8–53.9% $Al_2O_3$, and 23.8–33.6% $SiO_2$, when said surface layer contains CaO-based crystals as the predominant crystal phase; or
   (c) 31–48% SrO, 24–35.7% $Al_2O_3$, and 28–35% $SiO_2$, when said surface layer contains SrO-based crystals as the predominant crystal phase; or
   (d) 42.4–45% BaO, 10–15.9% $Al_2O_3$, and 41.7–45% $SiO_2$, when said surface layer contains BaO-based crystals as the predominant crystal phase.

* * * * *